(12) United States Patent
Harding

(10) Patent No.: US 10,681,041 B2
(45) Date of Patent: Jun. 9, 2020

(54) OUT-OF-BAND BIOMETRIC ENROLLMENT AND VERIFICATION USING INTERACTIVE MESSAGING

(71) Applicant: IMAGEWARE SYSTEMS, INC., San Diego, CA (US)

(72) Inventor: David Harding, Portland, OR (US)

(73) Assignee: IMAGEWARE SYSTEMS, INC., San Diego, CA (US)

( * ) Notice: Subject to any disclaimer, the term of this patent is extended or adjusted under 35 U.S.C. 154(b) by 0 days.

(21) Appl. No.: 14/986,122

(22) Filed: Dec. 31, 2015

(65) Prior Publication Data

US 2016/0226868 A1 Aug. 4, 2016

Related U.S. Application Data

(63) Continuation-in-part of application No. 14/254,849, filed on Apr. 16, 2014, now abandoned.

(60) Provisional application No. 61/812,640, filed on Apr. 16, 2013, provisional application No. 61/812,654, filed on Apr. 16, 2013, provisional application No. (Continued)

(51) Int. Cl.
*H04L 29/06* (2006.01)
*H04L 9/32* (2006.01)
*G06F 21/32* (2013.01)
*H04L 12/58* (2006.01)

(52) U.S. Cl.
CPC .......... *H04L 63/0861* (2013.01); *G06F 21/32* (2013.01); *H04L 9/3231* (2013.01); *H04L 63/10* (2013.01); *H04L 51/04* (2013.01)

(58) Field of Classification Search
CPC .......... H04L 29/06809; H04L 63/0861; G06F 21/32
See application file for complete search history.

(56) References Cited

U.S. PATENT DOCUMENTS 8,245,044 B2 * 8/2012 Kang .................... G06Q 20/12
705/35
9,306,905 B2 * 4/2016 Bidare .................. H04L 63/18
(Continued)

OTHER PUBLICATIONS

Communication Pursuant to Rule 114(2) EPC in European Patent Application No. 15878302.7, dated Mar. 9, 2020.
(Continued)

*Primary Examiner* — Daniel B Potratz
(74) *Attorney, Agent, or Firm* — Sheppard Mullin Richter & Hampton LLP

(57) ABSTRACT

A system and method for enabling out of band biometric verification is disclosed. The system includes a biometric engine coupled with an interactive messaging system and configured as an identity provider. The biometric identity provider includes a biometric enrollment process using open standard authentication protocols. The identity provider may answer calls generated by a service provider for biometric verification request for a user by sending an interactive message to a wireless mobile device associated to the user. The user captures and sends a biometric input to the identity provider. Biometrics provided by a user are compared by the biometric engine against biometric templates stored for that user in order to verify the user. The identity provider then sends a response back to the service provider. The service provider may grant or deny services to a user depending on the response.

6 Claims, 7 Drawing Sheets

Related U.S. Application Data

61/812,697, filed on Apr. 16, 2013, provisional application No. 62/099,106, filed on Dec. 31, 2014, provisional application No. 62/099,107, filed on Dec. 31, 2014.

(56) References Cited

U.S. PATENT DOCUMENTS

| | | | | | |
|---|---|---|---|---|---|
| 2006/0029190 | A1* | 2/2006 | Schultz | ............. | H04M 3/385 |
| | | | | | 379/88.01 |
| 2006/0041755 | A1* | 2/2006 | Pemmaraju | ............. | G06F 21/32 |
| | | | | | 713/182 |
| 2009/0116703 | A1* | 5/2009 | Schultz | ............. | G06F 21/32 |
| | | | | | 382/118 |
| 2009/0313165 | A1* | 12/2009 | Walter | ............. | G06F 21/35 |
| | | | | | 705/41 |
| 2015/0134956 | A1* | 5/2015 | Stachura | ............. | H04L 63/0807 |
| | | | | | 713/168 |
| 2016/0219046 | A1* | 7/2016 | Ballard | ............. | H04L 63/0861 |

OTHER PUBLICATIONS

Burr, William E et al., "Electronic Authentication Guideline," NIST Special Publication 800-63-2, 124 pages. Aug. 29, 2013.
Multiple BioID webpage screenshots from 2012, retrieved from BioID AG website, 2012, <web.archive.org/ web/20120602152440/ http://www.bioid.com/technology/ip-and-core-technologies/multimodal-biometrics.html>.

* cited by examiner

OUT-OF-BAND BIOMETRIC ENROLLMENT AND VERIFICATION USING INTERACTIVE MESSAGING

CROSS-REFERENCE TO RELATED APPLICATIONS

The present application claims priority to and is a continuation-in-part of U.S. patent application Ser. No. 14/254,849, filed on Apr. 16, 2014, and entitled "Integrated Interactive Messaging and Biometric Enrollment, Verification, and Identification System," which claims priority to U.S. Provisional Patent Application Nos. 61/812,640; 61/812,654; and 61/812,697, all of which were filed on Apr. 16, 2013, the disclosures of which are all herein incorporated by reference in their entireties. The present application also claims priority to U.S. Provisional Patent Application No. 62/099,106, filed on Dec. 31, 2014, and entitled "Out-of-Band Biometric Enrollment Using Interactive Messaging," and U.S. Provisional Patent Application No. 62/099,107, filed on Dec. 31, 2014, and entitled "Out-of-Band Biometric Verification Using Interactive Messaging," the disclosure of which are all herein incorporated by reference in their entireties.

BACKGROUND OF THE INVENTION

1. Field of Invention

The present invention relates generally to identity management and more particularly, to a technique for out-of-band biometric enrollment and verification using interactive messaging.

2. Description of Related Art

Many users of the Internet utilize web-based email applications, online services, social networking sites, and other websites that require authentication of the user. Systems for logging in to websites via a user name and password have been implemented across many websites. At times, a single user may have many login credentials for numerous different websites that the user may visit. For example, a user may have many email accounts from different email providers or a user may have different login credentials including passwords for accessing various online services from different banks. Typically, users like to have different passwords for different accounts so that if one password becomes compromised, then all passwords will not be compromised. Using multiple login identities may become troublesome for the user because a user may forget or confuse login credentials from the different online service sites.

Single sign-on (SSO) technology permits access control of multiple related, but independent computer systems. A user logs in once to an identity provider to gain access to online services from multiple disparate service providers without using different usernames or passwords. However, SSO technology poses a security risk if an imposter steals or discovers the SSO login credentials and gains access to all the online services and independent computer systems.

Biometrics is a generic term for characteristics that can be used to distinguish one individual from another, particularly through the use of digital equipment. An example of a biometric is a fingerprint. Trained analysts have long been able to match fingerprints in order to identify individuals. More recently, computer systems have been developed to match fingerprints automatically. Examples of biometrics that have been, or are now being, used to identify, or authenticate the identity of individuals include face (2D or 3D), hand geometry, fingerprint, finger geometry, iris, finger vein, retina, DNA (using segments from DNA), ear, odor, palm, gait, signature, and voice among others, the implementation of which are apparent to one of ordinary skill in the art.

Biometric authentication increases security and enables a user's identity to be validated without the user having to remember a user name and password. It is desirable to incorporate biometric authentication as an identity provider service to access multiple online services.

SUMMARY OF THE INVENTION

The present invention overcomes these and other deficiencies of the prior art by providing an integrated system combining operations of an interactive messaging system with a biometric engine in order to enhance security for a single sign-on identity provider.

According to an embodiment of the invention, an integrated system comprises an interactive messaging system operatively coupled with a biometric engine through a communications network connection such as the Internet. This integrated system also includes one or more online service providers. A biometric authentication service in communication with or incorporated within the interactive messaging system coordinates communication between the biometric engine and the interactive messaging system.

The present invention implements an application framework that allows interactive communication with one or more interactive messaging senders. This application framework includes data services, messaging services, brokering services, learning services, and biometric authentication services among others. Services in the application framework are used by a sender application which may configure, manage, send or push interactive messages to one or more mobile devices. Interactive messages may include a request for biometric enrollment along with corresponding action options that can be selected by the user when the user receives the interactive message. The mobile devices are capable of receiving or responding to interactive messages, as well as capturing one or more types of biometrics, e.g., face, finger, iris, and/or voice. The biometric engine may be coupled to or include a query router and may be operative coupled to one or more biometric data caches, which store biometric templates.

In an embodiment of the invention, a single sign-on identity provider enrolls a user using one or more biometric modalities. The user is a client of an online service provider such as a bank. The online service provider requests the identity provider to authenticate the user. The identity provider, by means of a server, checks if the user is already enrolled in the identity provider's biometric database. If not, the online service provider, by means of a server, requests user information via an interactive message to the user's mobile device and subsequently submits the user information through the identity provider to a biometric engine. The biometric engine adds the user information to its database or cache. The biometric engine then sends an e-mail, interactive message, or notification to the user with instructions for downloading and using a biometric authentication application. The user, by means of a mobile device, downloads and runs the biometric authentication application. The user enters into the application a preferred user name and password. A request is sent to the user's mobile device to capture one or more biometric probes. The user then employs the mobile device to submit the biometric probes to the biometric engine for enrollment where they are converted into biometric templates. The biometric engine enrolls the submitted biometrics, registers the user's device where the application has been installed, and associates the biometric templates and device with the user.

In an embodiment of the invention, a verification process within the integrated system begins when a service provider requests a user to be biometrically authenticated by the identity provider. The interactive messaging system determines the preferred conditions for biometric authentication. The interactive messaging system sends an interactive message requesting the capture of suitable biometric probes. A user responds by sending one or more biometric probes to the interactive messaging system, which subsequently sends those biometric probes to the biometric engine for verification. Query router within the biometric engine distributes the biometric probes to corresponding query engines, which compare the biometric probes against biometric templates already stored in the biometric data caches. The result of this comparison may be a score which indicates a probability of successful biometric matching. Biometric engine notifies a successful or failed biometric verification to the service provider which may subsequently deny or authorize the transaction. The interactive messaging system sends another interactive message to notify the user of a success or failure and may also include options for additional action to continue or conclude the verification process.

The present invention incorporates biometric authentication into interactive messaging, thereby, providing clients with secure and reliable transactions or communications. The present invention biometrically enrolls a client for later verification and identification services. In addition, the present invention combines the capabilities of both an interactive messaging service and biometric engine, including interactive communication, multimodal biometric operation, and situational support among others.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF EMBODIMENTS

Figure 1:
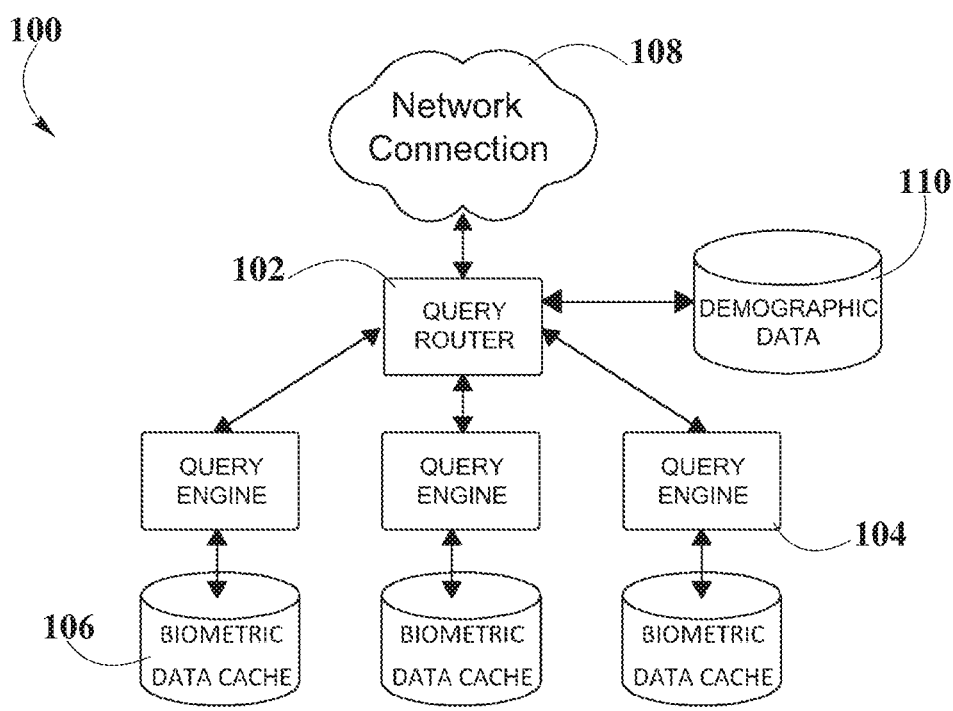
FIG. 1 illustrates a biometric engine according to an embodiment of the invention.

Further features and advantages of the invention, as well as the structure and operation of various embodiments of the invention, are described in detail below with reference to the accompanying FIGS. 1-7. Other embodiments may be used and/or other changes may be made without departing from the spirit or scope of the present disclosure. The illustrative embodiments described in the detailed description are not meant to be limiting of the subject matter presented here.

As used herein, certain terms are defined as follows:

"Biometric capture" refers to using a biometric input device or system to acquire biometric data from an individual in the form of images, templates, or other form;

"Biometric data" refers to information that may be used to verify or identify a person based on physical traits, attributes, or behaviors. Biometric data includes, but is not limited to images of fingerprints, faces, irises, and any binary data generated by biometric capture algorithms;

"Biometric fusion score" refers to any probability score that uses multiple biometric inputs or methods of processing to improve performance. For example, matching scores from multiple modalities are normalized and combined (e.g., fused) to create a single probability score;

"Biometric probe" refers to any captured biometric data that may be used to compare with or matched against one or more prior enrolled biometric templates;

"Biometric template" refers to a digital record of distinct characteristics that have been extracted by a biometric algorithm from biometric data associated with a person;

"Biometric verification" refers to a process of using biometric authentication to validate the identity of a person;

"Client" refers to a person or user having a computing device capable of receiving and responding to interactive messages, and capable of capturing one or more biometric modalities—a biometric client can also refer to the computing device itself;

"Interactive message" refers to an electronic message that is related to a previous message or a subsequent message. For example, an electronic message may be sent from an interactive messaging system server to one or more clients, where the electronic message includes a question and corresponding action options that may be selected by the client;

"Out-of-Band Authentication" refers to client authentication over a secondary communications network, channel, or stream of data separate from a primary communications network, channel, or stream of data. The primary and secondary networks or channels work simultaneously to authenticate a client. In an exemplary embodiment of the invention, the primary communications network is a data network and the secondary communications network is a public switched telephone network;

"Query engine" refers to a computer system capable of comparing biometric probes and biometric templates and may return a biometric score or a biometric fusion score;

"Query router" refers to software and/or hardware that may manage and queue biometric verification queries in a query engine; and "Token" refers to a unique identifier that has no intrinsic/explicit relationship to either biographic or biometric data, but can be used to isolate the specific biometric data for matching and/or analysis.

The present invention enables, among other things, out-of-band biometric enrollment and verification using interactive messaging. In an embodiment of the invention, an instant messaging system and one or more biometric engines are employed to allow the association of biometric probes and devices with clients upon registration into an authorized database of users of an identity provider.

FIG. 1 illustrates a biometric engine 100 according to an embodiment of the invention. Biometric engine 100 comprises a query router 102, one or more query engines 104, and one or more biometric data caches 106 associated with each query engine 104. Query router 102, although optional, is operatively connected to a suitable network connection 108, the identification and implementation of which is apparent to one of ordinary skill in the art. For example, network connection 108 can comprise a local area network (LAN), a virtual private network (VPN), a wireless area network (WAN), or any combination thereof to communicate to an interactive messaging system service via the Internet. Network connection 108 provides an operational connection with a client or a service provider that may use the biometric engine 100 as an identity provider.

Query router 102 includes software programmed according to the embodiments described herein and executed on a processor. Query router 102 can be associated with an optional demographic database 110 for storing demographic data, such as gender, age, or even personal information, such as name and telephone number, among others, of a client. The identification and implementation of the demographic database 110 is apparent to one of ordinary skill in the art. In another embodiment, demographic database 108 may be operated from a service provider infrastructure, in which case, biometric engine 100 does not directly associate the demographic data with biometric data when performing biometric authentication, thereby allowing anonymous biometric authentication through the use of tokens that can be used to isolate the specific biometric data for matching and/or analysis.

The demographic database 110 (and any other database discussed herein) may implement a database management systems (DBMS) such as, but not limited MySQL, PostgreSQL, SQLite, Microsoft SQL Server, Microsoft Access, Oracle, SAP, dBASE, FoxPro, IBM DB2, LibreOffice Base, FileMaker Pro, MongoDb, and/or any other type of database software that organizes collections of data.

Query router 102 is in communication with one or more query engines 104 through a suitable computer network, the identification and implementation of which is apparent to one of ordinary skill in the art. In an embodiment of the invention, each query engine 104 is implemented on a computer having installed thereon a suitable operating and biometric software according to the embodiments described herein. All query engines 104 can be implemented on the same computer or distributed among multiple computers. Each query engine 104 is associated with a biometric data cache 106, the implementation of which is also apparent to one of ordinary skill in the art. Each query engine 104 can be adapted to process a single biometric modality or multiple biometric modalities. In an embodiment of the invention, query engines 104 convert biometric data into templates for storage in biometric data cache 106 at enrollment. In another embodiment of the invention, the query engines 104 receive biometric templates created elsewhere, for example, from a biometric capture device. The query engines 104 create (or receive) biometric probes to compare against enrolled biometric templates at verification time.

In operation, query router 102 receives a call, such as a service-oriented architecture (SOA) call, from a client's device or a server associated with a service provider to verify the authenticity of a client's identity. The call includes user information that may be used by the biometric engine 100 to authenticate the biometric client. Information provided in the call may include, for example, demographic information, such as age, gender, city, and the like; or personal information, such as a name, a username, an email, a phone, or any information associated with the user that may be used by the biometric engine 100 for authentication. Alternatively, the call may be anonymous, i.e., without knowledge of biographic, demographic or otherwise identifying information. Information provided may also include a biometric probe that is to be compared against biometric templates previously stored in the biometric data caches 106. Query router 102 may route requests to the appropriate query engines 104, depending on the biometric type or work load on the query engines 104. Query router 102 monitors the activities of the query engines 104 and may combine their responses (success/fail) into a single SOA response that may be sent back to the client's device or service provider.

Figure 2:
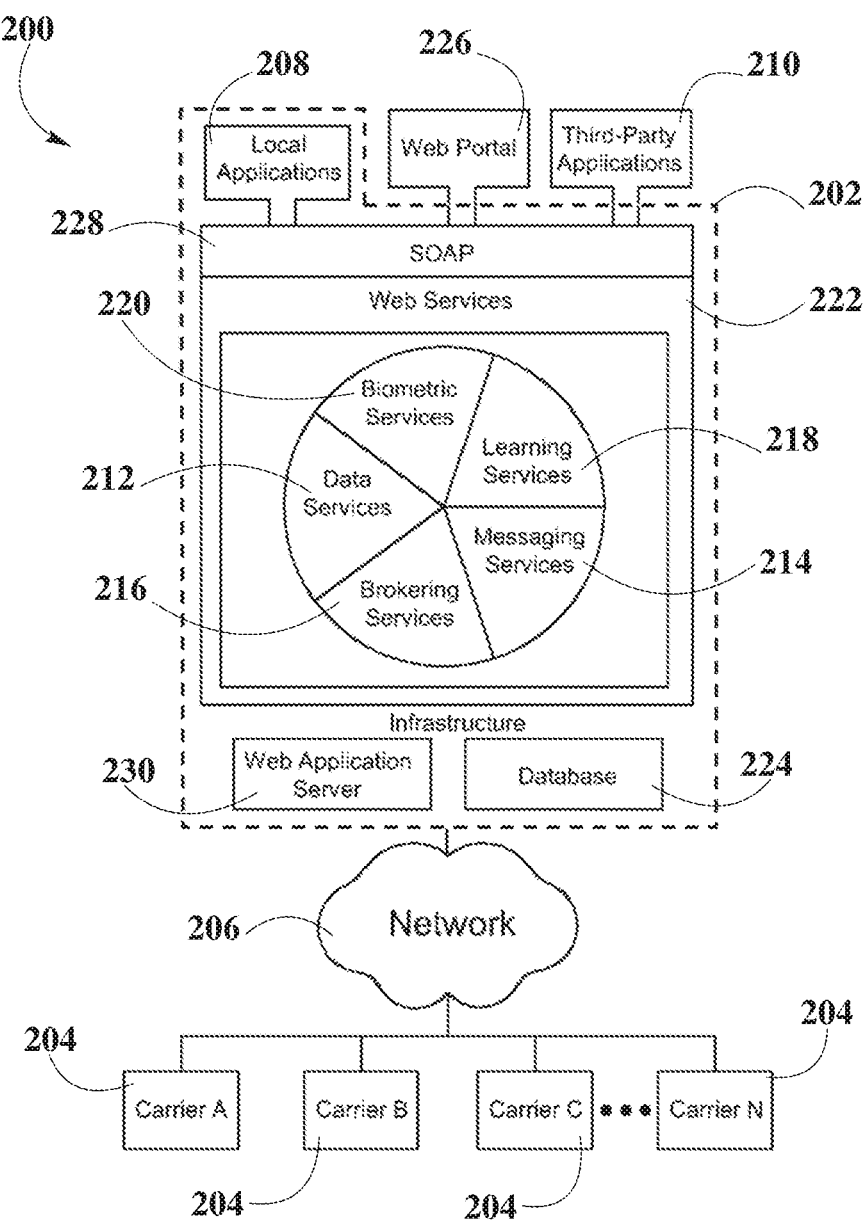
FIG. 2 illustrates an interactive messaging system according to an embodiment of the invention.

FIG. 2 illustrates an interactive messaging system (IMS) 200 according to an embodiment of the invention. IMS 200 comprises an application framework 202 for allowing communication with clients, both senders and recipients, by sending or pushing interactive messages to the client's mobile devices. In an embodiment of the invention, messages may be composed by filling in a pre-formed template. The application framework 202 pushes the messages to one or more carriers 204, which are connected to the application framework 202 via a network connection 206. The messages are sent to the mobile devices. Although four carriers are shown, any number (N) of carriers may be connected to the application framework 202. A messaging protocol on the application framework 202 allows both local applications 208 and outside or third party applications 210 to talk to core services. Services, located on the application framework 202 facilitate the delivery of messages by providing essential details and information that the application framework 202 uses to send or push the messages to mobile devices. Exemplary services as part of application framework 202 include one or more data services 212, one or more messaging services 214, one or more brokering services 216, one or more learning services 218, and one or more biometric authentication services 220, although additional services may be defined and utilized. The services are enabled via web services 222.

In one exemplary embodiment of the invention, learning services 218 are used to facilitate learning by sending or pushing study material, such as in the form of multiple choice questions, to recipients, such as students, among others. For example, vocabulary questions can be sent to the recipient when studying for the SAT. A word with four possible definitions can be pushed to the student's wireless device. Learning services 218 accomplish this managing a process for the user in order to learn new information, including concept presentation pre-testing, mastery drilling, final testing, and follow up review. Furthermore, learning services 218 allow external application and third parties to add data or additional learning curriculum to learning modules stored in learning services 218. Learning services 218 can also report on learning status by user and by curriculum module. Additionally, learning service 218 can also present curriculum to users in a game context wherein players compete on response time and accuracy.

Data services 212 store information, including profiles of users, which may be used to determine if and when an interactive message is to be sent to the recipient. Information stored within the profiles can include an access control list that filters or blocks specific senders, photographs, and sounds which might be included in a message and/or a do not disturb window specifying when the recipient does not want to be disturbed with an interactive message. Additional information in the profiles can include a priority profile where the user specifies the level of intrusion for receiving an interactive message (e.g., do not interrupt if on a call) and/or an ID, password information, and/or frequently used responses to be included in a message, a list of birthdays and anniversaries of friends and family and other holidays, among others. Other information, such as pending messages and system information can be stored in data services 212. Furthermore, data services 212 can store learning profiles for storing user progress across learning modules and learning module setup, learning curriculum and responses. Each user creates a profile and stores the profile on a database 224 located on the application framework 202. Other information contained in a profile can include a list of people whose messages should be immediately sent, and a picture of the user and times when a user does not want to receive a message. The profiles can be accessed through a web portal 226 allowing senders and recipients to update information from their profile.

Database 224 is implemented through a database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that organizes collections of data. Database 224 is used to store data, information, and rules for pushing the interactive messages to a mobile device. The database 224 can comprise user preferences, photographs, sounds, drop down menus, learning curriculum, birthday anniversary lists, and other holidays, among others.

Messaging services 214 pushes or sends an interactive message to the mobile device of a client. Before the message can be pushed, messaging services 214 first determines if the client's mobile device is capable of receiving a pushed message. If the mobile device is capable of receiving the message, messaging services 214 converts the message into a format readable by the mobile device and, in turn, pushes the message to the mobile devices. If the mobile device is not capable of receiving a pushed message, messaging services 214 converts the message to an instant message via short message service (SMS) or multimedia message service (MMS) message, or a proprietary instant messaging service such as, but not limited to BlackBerry Messenger (BBM), Google Chat, or Skype for Mobile. Furthermore, messaging services 214, if necessary, is capable of formatting the message into a format that includes multimedia capabilities, such as text, sound, graphics, video, or a turn based interactive game, among others. Messaging services 214 also have the capability of providing the sender with a status of the message, e.g., if the recipient has responded and what the response is. The status of the message can be delivered to the sender with electronic data exchange, e-mail, instant messaging, on-line access (e.g., check the status via a web site), and WAP Push, including BREW and J2ME(JAVA), among others.

Brokering services 216 manage the coordination of clients, both senders and recipients, and the delivery of messages to mobile devices. Senders can specify a day and time for the messages to be delivered to the recipients. Senders can include both people and devices/servers. Recipients can have the option of rescheduling the response of messages to their wireless devices by selecting a "snooze" feature. The "snooze" feature terminates the interactive message and schedule a future time when the message can be resent to the recipient. Once this feature is selected, brokering services 216 resend the message at a later time, such as in 10 minutes, 30 minutes, an hour, or any other time specified by the recipient. Brokering services 216 also manages the level of intrusion of the message based on receiver maintained profile criteria via web portal 226 with settings by originator, data type, priority, and access control list.

The biometric authentication services 220 are used to facilitate biometric data exchange between senders and receivers. A sender can configure a message including the request for a biometric capture in order to perform different actions, such as to authenticate and authorize a client. Biometric authentication services 220 push or send an interactive message requesting a biometric input from a client. Before the message can be pushed, biometric authentication services 220 determine what biometric modalities are supported by the client or clients. Biometric authentication services 220 manage and store biometric information from the different client devices in their respective profiles, which in turn are stored in database 224. Biometric information stored in user profiles includes a list of biometric modalities supported by the mobile device of the client as well as statistical information of biometric push messages sent to the client. Receiver profiles are managed through web portal 226.

Biometric authentication services 220 manage and store sender profiles. Sender profiles include a list of supported biometric modalities as well as rules for biometric requests depending on the actions to be performed. For example, if a client wants to access a bank account, the sender may require more than one biometric modality for authentication in order to increase security, therefore, a push message requesting multiple biometric modalities may be sent to a client. Web portal 226 also includes options for a sender to manage their profile.

Biometric authentication services 220 receive a response to a push method that includes biometric probes captured by the client's mobile device. Biometric authentication services 220 is capable of providing the sender with a status of the request sent to the client, e.g., if the client has responded to the request as well as to transfer the biometric probe sent by the client to the sender. Biometric authentication services 220 may answer request calls sent by a biometric engine, such as the one described in FIG. 1. Biometric authentication services 220 may request a biometric probe through a push message, which is then sent by the biometric authentication services 220 to a biometric engine for matching. Biometric authentication services 220 also provide the receiver with a status message of their biometric matching results.

Application framework 202 employs application logic to define how the business policies, rules, and required services of the interactive messaging system of the present invention function. Local applications 208 store the application logic, call web services 222 using SOAP messaging 228, and instruct or trigger the construction and delivery of the interactive messages. Web services 222 share business logic, data, and process through a programmatic interface across a network amongst the different services. Since web services 222 may not be tied to any one operating system or programming language, different applications from different sources can communicate with each other without time consuming custom coding since all communications can be formatted in XML. As a result, web services 222 provide a platform for exposing or making accessible the core services to third party applications 210 using software that is running on different operating systems and devices, written using different programming languages and tools from multiple vendors, all potentially developed and deployed independently. As a result, an open architecture for third parties is created. Furthermore, web services 222 enable the interactive messaging system of the present invention to be used with or without a browser.

Also located on the application framework 202 is a web application server 230. Web application server 230 includes software that runs on the application framework 202, answers web calls from a mobile device, via web portal 226, and via third party applications 210 and local applications 208. When answering a call, web services 222 looks up the requested information in database 224. The database 224 is used to store data, information and rules for pushing the interactive messages to a wireless mobile device. Specifically stored within the database 224 are user preferences, photographs, sounds, drop-down menus, learning curriculum, birthday anniversary lists and other holidays. Upon receiving a call the web application server 230 retrieves the information in the database 224 via data services 212. FIG. 2 enables users to send various types of interactive messages. The various types of messages include, among other things, scheduling a meeting, sending a reminder, initiating a multi-player game on a wireless device, interactive learning, and biometric authentication messages.

Figure 3:
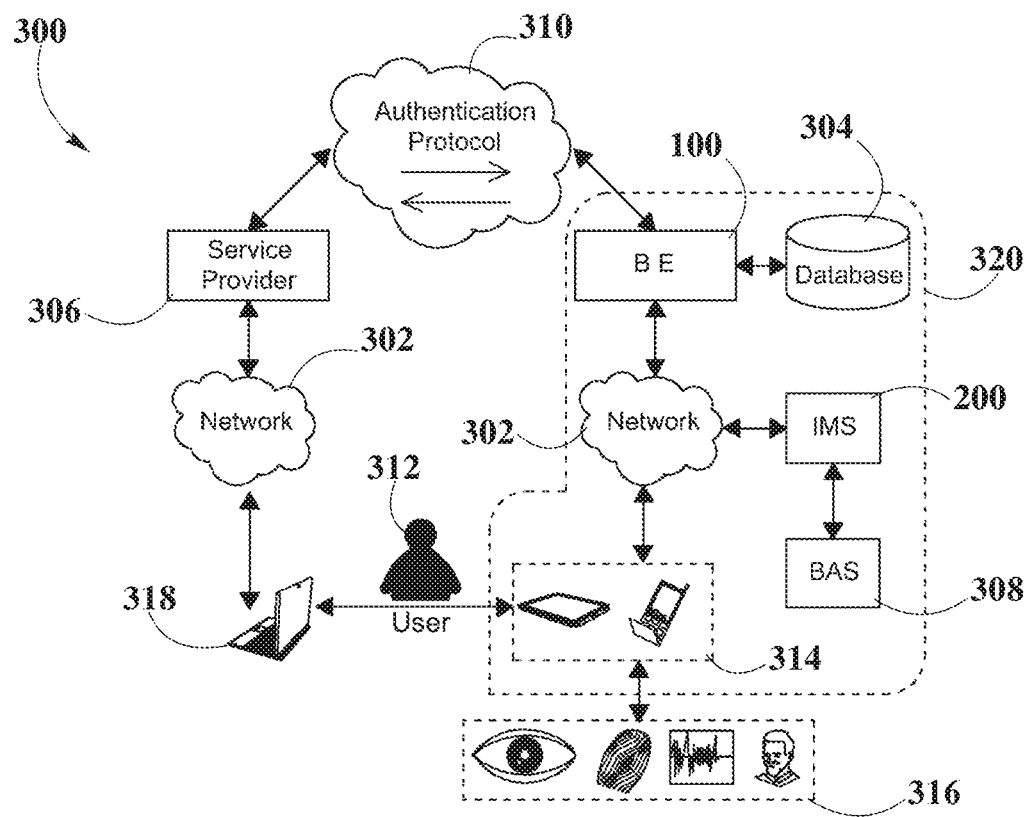
FIG. 3 illustrates the system architecture for out-of-band biometric enrollment using interactive messaging according to an embodiment of the invention.

FIG. 3 illustrates system architecture 300 for out-of-band biometric enrollment using interactive messaging, according to an embodiment of the invention. The system architecture 300 includes different components which may dynamically interact with each other through network connections 302. Network connections 302 refer to any suitable connection between computers, such as intranets, local area networks (LAN), virtual private networks (VPN), wireless area networks (WAN), and the Internet, among others readily understood by one of ordinary skill in the art. System architecture 300 includes one or more computing hardware suitable for executing the components within system architecture 300, according to embodiments described herein. Components of system architecture 300 may be executed by a server, a single computer, or multiple computers in a distributed configuration.

System architecture 300 includes one or more service providers 306, one or more identity providers 320. The service provider 306 may be any application (e.g., E-commerce web sites, educational web sites, banks, forums, etc.) that provides services to a client through computing devices 318. The identity provider 320 includes one or more databases 304, one or more biometric engines 100 (such as shown in FIG. 1), and one or more IMS 200 (such as shown in FIG. 2). Biometric engine 100 is operatively coupled to one or more IMS 200, through network connections 302, in order to provide an identity provider infrastructure 320. Identity provider 320 includes a biometric authentication service (BAS 308), which may be within IMS 200 or included as a separated module operatively coupled to IMS 200. BAS 308 is used to facilitate biometric data exchange between senders and receivers. Biometric engine 100 communicates with the IMS 200 by generating web calls to a web application server configured within the IMS 200. The web application server also responds back to web calls generated by biometrics engine 100 based on information stored in a database within IMS 200 that may include rules or logic for answering these calls.

Service provider 306 communicates with identity provider infrastructure 320 through a network connection 302 using authentication protocols 310, such as security assertion markup language (SAML), OpenID, XML, or any other suitable framework for communicating user authentication. Service provider 306 enables users to access services by allowing them to be authenticated by the identity provider 320 infrastructure.

In one embodiment of the invention, authentication protocol 310 may employ a SAML based framework for allowing biometric enrollment between service provider 306 and biometrics engine 100; thus, authentication protocol 310 may allow exchanging user authentication and authorization data of a user 312 to one or more service providers 306. Using SAML, an online service provider 306 may contact a separate online identity provider 320 to authenticate users 312 who are trying to access secure content. SAML protocol, comprising XML-based request and response message formats, may be bound to many different underlying communications and transport protocols; SAML currently defines one binding, to SOAP over HTTP. SAML authorities may use various sources of information, such as external policy stores and assertions that were received as input in requests, in creating their responses. In an SAML scenario, the identity provider 320 asserts the identity of user 312 and the service provider 306 may consume the assertion and pass the identity information to an authentication application In another embodiment, authentication protocol 310 may employ an OpenID based framework for allowing biometric enrollment between service provider 306 and biometrics engine 100. Using open source authentication protocol 310 allows the integration of biometrics engine 100 as a plug-in solution to provide biometric authentication to a plurality of service providers 306.

Biometric engine 100, service provider 306, and IMS 200 include a central processing unit run related algorithms or computer executable program instructions that may be executed by a server, a single computer, or multiple computers in a distributed configuration; and may be configured to interact with one or more components of the same or different type operating within system architecture 300. Each central processing unit may include a processor with computer-readable medium, such as a random access memory (RAM) coupled to the processor. Examples of a processor may include a microprocessor, an application specific integrated circuit (ASIC), and a field programmable object array (FPOA), among others.

System architecture 300 allows for one or more computing devices 318, displaying a graphical user interface configured to receive information from the system architecture 300, to request and/or feed information dynamically through the interaction of the computing device 318 with different software modules. Examples of computing device 318 may include desktop computers, laptop computers, tablets, among others.

One or more mobile devices 314 may be operatively coupled with biometric engine 100 and IMS 200 through network connection 302. In other embodiments, such connection may be implemented through 3G, 4G, Wi-Fi, WiMax, and landline broadband, among others.

Mobile devices 314 are used to capture biometrics of user 312. Examples of mobile devices 314 may include smartphones, desktop computers, laptop computers, tablets, and PDAs with a camera, a voice recorder, a fingerprint scanner, and/or other biometric probes 316 capturing components, among others, and any subset thereof. In one embodiment, mobile devices 314 support multimodal biometrics for capturing a plurality of biometric probes 316 including, but not limited to face, fingerprint, iris, and voice, among others, and any subset thereof. Mobile devices 314 submit one or more biometric probes 316 to biometric engine 100 for verification. Biometric engine 100 matches the biometric probe (which may first require converting the probe into a template) against previously stored biometric templates. Matching may result in individual scores for each type of biometric template being compared, for example, one score may be generated for the iris comparison, and another score for the voice comparison. The biometric scores generated for the different modalities of biometric probes 316 may be combined into a single fusion biometric score that can be used for validating the biometric authentication.

One or more clients 312 may enroll their identities through the use of one or more mobile devices 314 in communication with a biometrics engine 100 in the cloud to perform one or more transactions using a computing device 318. A transaction may include one or more users 312 making an online purchase of one or more items or services over the Internet or cloud using one or more computing devices 318. For example, client 312 may enter a website using computing device 318 for making a particular purchase, in which case, that particular website may require biometric authentication. To accomplish the biometric authentication, client 312 needs to perform a biometric enrollment in order to be able to complete a transaction and make a purchase, for example, after swiping a credit card to purchase an item or service in a store.

Service provider 306 requests the enrollment of user 312 before being able to approve any transaction. For example, service provider 306 may be a bank, an online retailer, a cloud-based application, a store, a webpage, or a service company requiring the authentication of user 312 who may be using a credit card for acquiring goods or services.

Client 312 initiates a transaction with a computing device 318 in the cloud through a suitable network connection 302 with service provider 306. Authentication protocol 310 requests user 312 a username, password, and one or more biometric probes 316. Biometric probes 316 may be analyzed by biometrics engine 100 and stored in database 304 to be used in further biometric authentication operations.

IMS 200 sends interactive messages requesting biometric probes 316 to a client's mobile device 314. When receiving the message, the client may respond to the message providing the biometric probes 316 requested. BAS 308 sends the biometric probes 316 to the biometrics engine 100 for biometric matching. The biometrics engine 100 compares biometric probes 316 received by the BAS 308 against biometric templates previously stored in database 304 for the user at enrollment. The biometric matching may yield a score that represents the possibility that the biometric template and the biometric probe 316 are from the same identity. Identity provider 320 sends a response back to a service provider 306 in order to verify if the client has been successfully authenticated.

Figure 4:
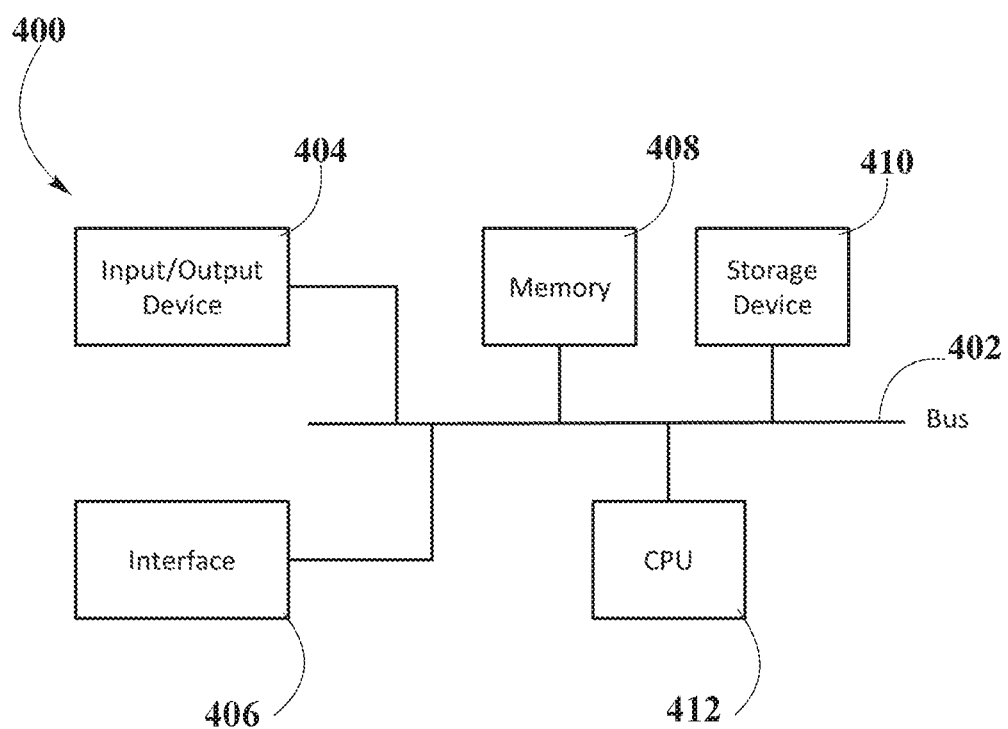
FIG. 4 illustrates the block diagram of components in a client computing device according to an embodiment of the invention.

FIG. 4 illustrates the block diagram of example components in a computing device 400, in which one or more embodiments of the present invention may operate. According to some embodiments, computing device 400 can be a server, a user computing device, a smartphone, a desktop computer, a laptop computer, a tablet, a PDA, and/or another type of processor-controlled device that may receive, process, and/or transmit digital data, among others. Computing device 400 comprises a bus 402, an input/output device 404, an interface 406, a memory 408, a storage device 410, and one or more central processing units (CPU 412). In another embodiment, computing device 400 may include additional, fewer, different, and/or differently arranged components than are illustrated in FIG. 4.

Bus 402 allows components within computing device 400 to communicate with each other. Input/output device 404 includes peripherals and/or other mechanisms that enable a user to input information to computing device 400, such as a keyboard, a mouse, a button, a touch screen, voice recognition, and biometric capturing mechanisms, among others. Input/output device 404 may also include a mechanism that outputs information to the user of computing device 400, such as a display or touchscreen, a light emitting diode (LED), and a speaker, among others. Interface 406 may include mechanisms that may enable computing device 400 to communicate with other computing devices and/or systems through network connections. Network connections refer to any suitable connections between computers such as intranets, local area networks (LAN), virtual private networks (VPN), wireless area networks (WAN), and the Internet, among others. Memory 408 includes a random access memory (RAM) or another type of dynamic storage device 410, which may store information and instructions for execution by CPU 412. Storage device 410 may also include a magnetic and/or optical recording medium, such as read-only memory, flash memory, ferroelectric RAM (F-RAM) hard disks, floppy disks, and optical discs, among others. CPU 412 may include a microprocessor, an application specific integrated circuit (ASIC), or field programmable object array (FPOA), among others, which may interpret and execute instructions.

According to some embodiments of the present disclosure, at least one computing device 400, such as a server and a user computing device, among others, may perform certain operations that may be required for the proper operation of system architecture for out-of-band biometric enrollment using interactive messaging. User computing devices and a server, among others, may perform these operations in response to CPU 412 executing software instructions contained in a computer-readable medium, such as memory 408.

Software instructions may be read into memory 408 from another computer-readable medium, such as storage device 410, or from another computing device 400 via communication interface 406. Software instructions contained in memory 408 may cause CPU 412 to perform one or more suitable processes which may be further described in later embodiments. Alternatively, hardwired circuitry may be used in place of or in combination with software instructions to implement processes described here. Thus, implementations described here are not limited to any specific combination of hardware circuitry and software.

Figure 5:
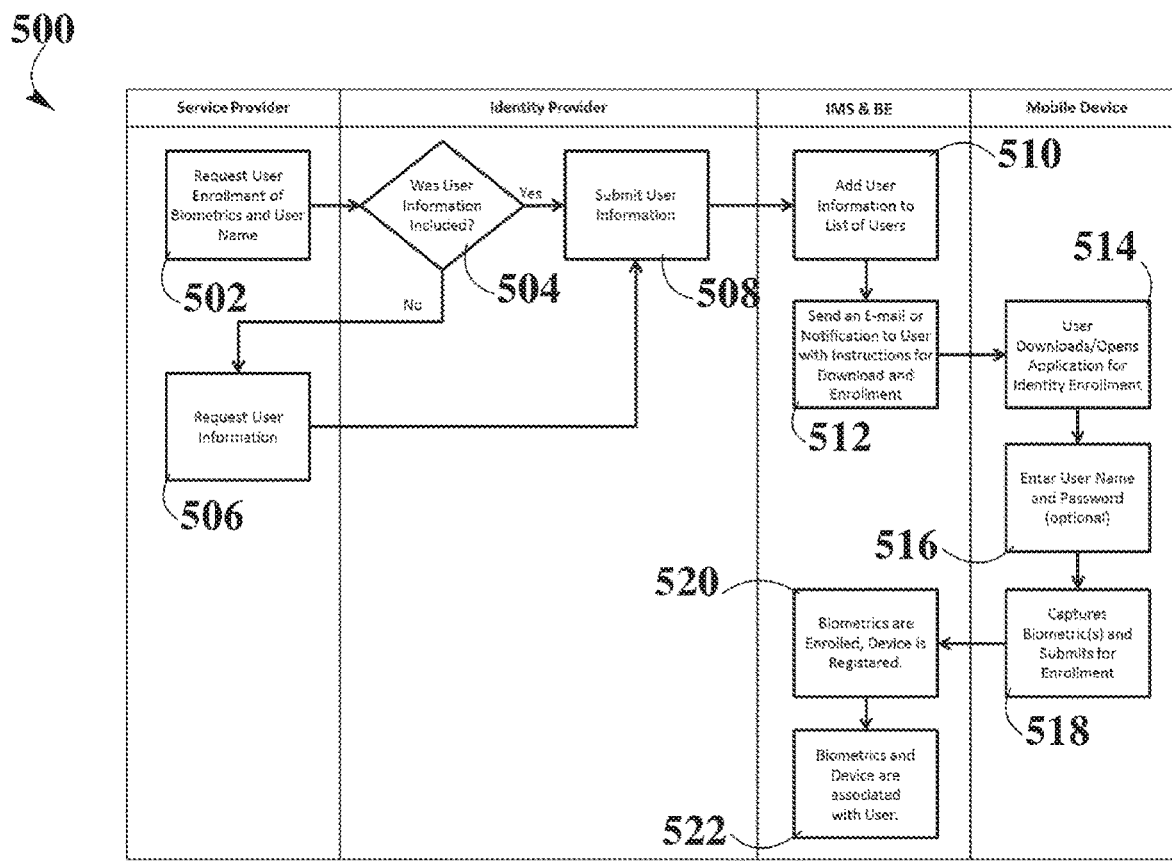
FIG. 5 illustrates a method for out-of-band biometric enrollment using interactive messaging according to an embodiment of the invention.

FIG. 5 illustrates a method 500 for out-of-band biometric enrollment using interactive messaging according to an exemplary embodiment of the invention. Here, a SAML authentication protocol is employed as a gateway to biometric enrollment using mobile interactive push messaging. Method 500 for out-of-band biometric enrollment using interactive messaging may start when a SAML service provider requests 502 to a SAML identity provider for one or more clients' enrollment in order to allow access to the services and/or products offered by the service provider. A service provider can be an online retailer, a cloud-based application, an online banking website, a webpage, a store, or a company requesting a client's enrollment. The identity provider may maintain and manage identity information for clients and may provide authentication to other service providers.

The identity provider may subsequently check 504 if the client information is already included in the list of users within the identity provider's database. If the information is not included within the identity provider's database, service provider requests 506 the user information to subsequently submit 508 the user information to a biometric engine, through the identity provider. If the information is included within the identity provider's database, identity provider submits 508 the client information to the biometric engine, where biometric engine may add 510 the user information within the already existing list of users.

If necessary, biometric engine sends 512 an e-mail or notification to the client with instructions for downloading and using a biometric authentication application. The client employs a mobile device capable of supporting multimodal biometric authentication to download 514 and open the application to perform the identity enrollment. Once the mobile device runs the application, the client employs such device to enter 516 into the application a preferred user name and, if desired, a password. In other embodiments, the client may also include a phone number, address, or any other suitable information that may serve as an identifier.

Once a username has been selected, the application requests to capture 518 one or more biometric probes. The client employs the mobile device to capture 518 one or more biometric probes and subsequently submit the generated information (e.g., username, password, biometric probes, mobile device's ID) to the biometric engine for enrollment.

Biometric engine then enrolls 520 the submitted biometrics into one or more biometric data caches depending of the type of biometric modality; while the username, password, and other identifying information, such as mobile device's ID, are stored in a database within the biometric engine, where such information is associated 522 with the user. A device ID may include a MAC address, a phone number, integrated circuit card identifier (ICCID), or any suitable unique identifier that may allow recognizing and sending interactive messages to the mobile device used to open the authentication application. The SAML identity provider may now identify as valid the enrolled user and the SAML service provider may allow the user to have access to the services and/or products offered.

Figure 6:
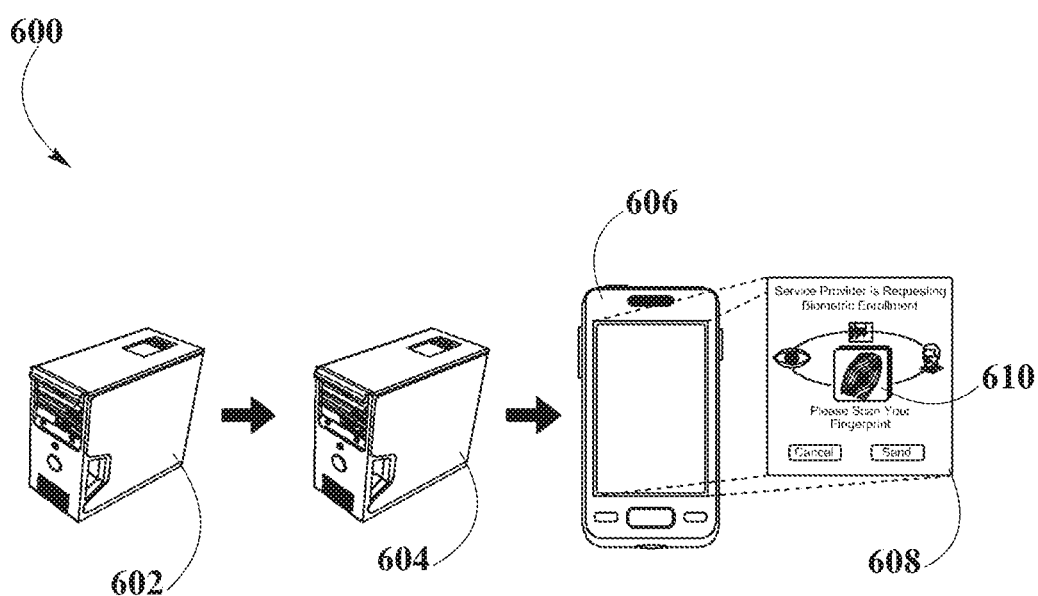
FIG. 6 illustrates an architecture for out-of-band biometric enrollment and verification using interactive messaging according to an exemplary embodiment of the invention.

FIG. 6 illustrates an architecture 600 for out-of-band biometric enrollment using interactive messaging, according to an exemplary embodiment where a web application server 602 uses a mobile access gateway 604 to send to a mobile device 606 an interactive message 608 requesting biometric probes to perform a user enrollment.

The mobile access gateway 604 channels push messages to the appropriate mobile devices 606. The web application server 602 may be included as part of IMS which may in turn include the rules defined by the sender for pushing the interactive messages to mobile devices 606. The interactive message 608 notifies the user about the new security policy that has been applied and request to store biometrics probes for a future log in session to the service provider that the user is trying to access.

Interactive message 608 is designed using different configurations which may be based on information stored in the IMS related to the user of the device, service provider preferences, user preferences, security level, modalities supported by the mobile device, modalities supported by a biometrics engine, etc. In the illustrated example embodiment, the web application server 602 determines that mobile device 606 supports a face recognition biometric modality. Interactive message 608 may then include the option to take a picture using a camera from the mobile device 606.

Example #1

The following provides an example application of the disclosed method 500 for out-of-band biometric enrollment using interactive messaging where a related enrollment process may be performed by system architecture 300 to access a service provider. In this example, a user used to log in with username and password credentials. However, the service provider may have implemented biometric authentication into the security policy for protecting the user's identity and enhancing security.

As seen in FIG. 6, the service provider's web application server 602 employs a mobile access gateway 604 to communicate with a mobile device 606 and send an interactive message 608, which contains a request to submit one biometric probe to proceed with the user enrollment employing biometric authentication. The interactive message 608 provides options to select one type of biometric probe 610 from which the user selects to provide a fingerprint from the options provided. After capturing the fingerprint, the user selects the option to send the biometric probe and the generated data is sent to the web application server 602. The web application server 602 then associates the captured biometric probe with the user profile and the device employed to log in, while a biometric engine may convert the biometric probe(s) into corresponding biometric template(s) which can be stored in one or more data caches.

In a next log in session, the user can provide a biometric probe to be verified or identified against stored templates, thereby, allowing access to the service provider.

Figure 7:
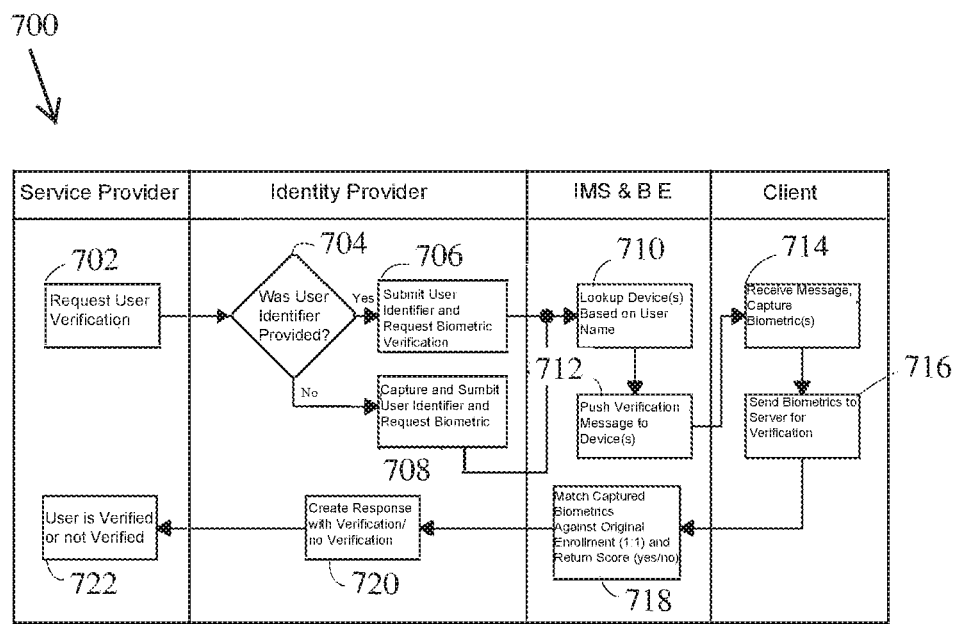
FIG. 7 illustrates a method for out-of-band biometric verification using interactive messaging according to an exemplary embodiment of the invention.

FIG. 7 illustrates a method 700 for out-of-band biometric verification using interactive messaging according to an exemplary embodiment of the invention. At step 702, a service provider requests a user for verification to the identity provider. The request may be generated using authentication protocols calls such as, but not limited to SAML, OpenId, SSO, or others, the identification and implementation of which are apparent to one of ordinary skill in the art. In one embodiment, the request call includes information related to the user, such as name, username, password, email, login name, phone, etc. At step 704, a determination is made to verify if a service provider has provided enough user information for biometric verification. If enough user information has been provided, a request for biometric verification is submitted to a biometric engine (step 706). If user information is not included in the request or it is insufficient for verification, the system captures and submits the user information (step 708) from cookies, a log in screen or any user information source. The biometric engine and interactive messaging system then use the information provided to search for a wireless mobile device associated to that user in a database of enrolled users (step 710). For example, the interactive messaging system searches for the phone number associated with the user information in order to push a message to the wireless mobile device. The interactive messaging system then pushes a verification message (step 712) to the device of the user requesting biometric input. Upon receiving a message requesting biometric input, the user uses any available biometric capturing modality enabled by the wireless mobile device to capture a biometric probe (step 714). For example, a user uses a microphone from a wireless mobile device in order to provide a voice biometric probe. The user may then respond back to the biometric request and send a biometric probe for biometric verification (step 716). The interactive messaging system then receives the response to the push message sent and sends the biometric probe captured by the user to the biometric engine for biometric verification. In step 718, the biometric engine compares the received biometric probe against the original biometric templates stored for that user at enrollment. The comparison yields a score that is used to determine if both the biometric probe and the biometric template belong to the same person. A response is created and sent to the service provider which includes the results of the matching process (step 720). The service provider may then grant or deny access or services to the user depending on the result (step 722).

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

I claim:

1. An integrated interactive messaging system comprising:
    a first client device used by a user;
    an interactive messaging server comprising one or more computers and configured to communicate an interactive push message to a second client device used by the user;
    a biometric engine, executed on a computer, configured to verify the user via one or more biometrics captured at the second client device; and
    wherein the interactive push message comprises a request for one or more biometric probes and is selected from the group consisting of: a short message service (SMS) message, a multimedia messaging service (MMS) message, an electronic mail (e-mail) message, a mobile application push notification, and a web push notification;
    the biometric engine is configured to communicate with a service provider using an out-of-band network and the interactive messaging server using a secondary network, wherein the out-of-band network and the secondary network are distinct from a primary network connecting the first client device and the service provider;

the biometric engine is configured to receive, using the-out-of-band network, a request from the service provider for verification of the user;

the biometric engine is configured to communicate with the interactive messaging server to request the one or more biometric probes from the user;

the one or more biometric probes are generated at the second client device using biometric information collected from the user by the second client device in response to receiving the interactive push message;

the biometric engine is configured to receive the one or more biometric probes using the secondary network;

the biometric engine is configured to compare the one or more biometric probes with biometric templates stored in a database; and the biometric engine is configured to provide a response to the service provider representing the possibility that the one or more biometric probes and the biometric templates are from the same user.

2. The system of claim 1, wherein the response to the service provider comprises a biometric fusion score.

3. An integrated interactive messaging method, the method comprising:

a service provider communicating, using an out-of-band network, with a biometric engine and an interactive messaging server and also communicating, using a primary network, with a first client device associated with a user, wherein the out-of-band network is distinct from the primary network;

receiving a request at a biometric engine, from the service provider using the out-of-band network, for verification of the user, wherein the request is sent by the service provider in response to receiving a request using the primary network from the first client device;

communicating, using a secondary network, one or more interactive push messages, from the interactive messaging server to a second client device of the user, requesting one or more biometric probes from the user, wherein the one or more interactive push messages comprises a request for biometric capture and are selected from the group consisting of: a short message service (SMS) message, a multimedia messaging service (MMS) message, an electronic mail (e-mail) message, a mobile application push notification, and a web push notification;

generating, at the second client device, one or more biometric probes from information collected from the user in response to receiving the one or more interactive push messages;

receiving, at the biometric engine, the one or more biometric probes, wherein the one or more biometric probes are received using the secondary network;

comparing the one or more biometric probes with biometric templates stored in a database; and providing a response to the service provider representing the possibility that the one or more biometric probes and the biometric templates are from the same user.

4. The method of claim 3, wherein the one or more biometric probes are different biometrics.

5. The method of claim 3, wherein the response to the service provider comprises a biometric fusion score.

6. The method of claim 3, wherein the one or more interactive push messages comprises a question and corresponding action options that may be selected by the user.

* * * * *